US008018260B2

United States Patent
Papageorgiou et al.

(10) Patent No.: US 8,018,260 B2
(45) Date of Patent: Sep. 13, 2011

(54) COMPENSATION OF DEGRADATION OF PERFORMANCE OF SEMICONDUCTOR DEVICES BY CLOCK DUTY CYCLE ADAPTATION

(75) Inventors: Vassilios Papageorgiou, Austin, TX (US); Maciej Wiatr, Dresden (DE); Jan Hoentschel, Dresden (DE)

(73) Assignee: Advanced Micro Devices, Inc., Austin, TX (US)

( * ) Notice: Subject to any disclaimer, the term of this patent is extended or adjusted under 35 U.S.C. 154(b) by 68 days.

(21) Appl. No.: 12/604,532

(22) Filed: Oct. 23, 2009

(65) Prior Publication Data

US 2010/0134167 A1    Jun. 3, 2010

(30) Foreign Application Priority Data

Nov. 28, 2008  (DE) .................. 10 2008 059 502

(51) Int. Cl.
*H03K 5/14*   (2006.01)
(52) U.S. Cl. .................... 327/172; 327/175; 324/762.02
(58) Field of Classification Search .......... 327/172–175; 324/537, 706.01, 706.02, 706.03
See application file for complete search history.

(56) References Cited

U.S. PATENT DOCUMENTS

| 6,903,564 | B1 | 6/2005 | Suzuki | 324/763 |
| 7,322,001 | B2 * | 1/2008 | Boerstler et al. | 714/733 |
| 7,330,061 | B2 * | 2/2008 | Boerstler et al. | 327/175 |
| 7,333,905 | B2 * | 2/2008 | Boerstler et al. | 702/79 |

FOREIGN PATENT DOCUMENTS

WO   WO 2007/039516 A1   4/2007

OTHER PUBLICATIONS

Translation of Official Communication from German Patent Office for German Patent Application No. 10 2008 059 502.0 dated Jul. 24, 2009.

\* cited by examiner

*Primary Examiner* — An Luu
(74) *Attorney, Agent, or Firm* — Williams, Morgan & Amerson

(57) ABSTRACT

The device degradation of integrated circuits may be compensated for by appropriately adapting the duty cycle of the clock signal. For this purpose, a correlation between the duty cycle and the overall performance characteristics of the integrated circuit may be established and may be used during the normal field operation of the device in order to modify the duty cycle. Hence, an efficient control strategy may be implemented since the duty cycle may be efficiently controlled, while at the same time a change of clock signal frequency and/or an increase of supply voltage may not be required.

25 Claims, 4 Drawing Sheets

COMPENSATION OF DEGRADATION OF PERFORMANCE OF SEMICONDUCTOR DEVICES BY CLOCK DUTY CYCLE ADAPTATION

BACKGROUND OF THE INVENTION

1. Field of the Invention

Generally, the present disclosure relates to sophisticated integrated circuits, such as CPUs including highly scaled transistor elements, and compensation techniques for enhancing product performance.

2. Description of the Related Art

The fabrication of advanced integrated circuits, such as CPUs, storage devices, ASICs (application specific integrated circuits) and the like, requires the formation of a large number of circuit elements on a given chip area according to a specified circuit layout, wherein field effect transistors represent one important type of circuit elements that substantially determine performance of the integrated circuits. Generally, a plurality of process technologies are currently practiced, wherein, for many types of complex circuitry, including field effect transistors, MOS technology is currently one of the most promising approaches due to the superior characteristics in view of operating speed and/or power consumption and/or cost efficiency. During the fabrication of complex integrated circuits using, for instance, MOS technology, millions of transistors, e.g., N-channel transistors and/or P-channel transistors, are formed on a substrate including a crystalline semiconductor layer. A field effect transistor, irrespective of whether an N-channel transistor or a P-channel transistor is considered, typically comprises so-called PN junctions that are formed by an interface of highly doped regions, referred to as drain and source regions, with a slightly doped or non-doped region, such as a channel region, disposed adjacent to the highly doped regions. In a field effect transistor, the conductivity of the channel region, i.e., the drive current capability of the conductive channel, is controlled by a gate electrode formed adjacent to the channel region and separated therefrom by a thin insulating layer. The conductivity of the channel region, upon formation of a conductive channel due to the application of an appropriate control voltage to the gate electrode, depends on the dopant concentration, the mobility of the charge carriers and, for a given extension of the channel region in the transistor width direction, on the distance between the source and drain regions, which is also referred to as channel length. Hence, in combination with the capability of rapidly creating a conductive channel below the insulating layer upon application of the control voltage to the gate electrode, the conductivity of the channel region substantially affects the performance of MOS transistors. Thus, as the speed of creating the channel, which depends on the conductivity of the gate electrode, and the channel resistivity substantially determine the transistor characteristics, the scaling of the channel length, and associated therewith the reduction of channel resistivity and increase of gate resistivity, is a dominant design criterion for accomplishing an increase in the operating speed of the integrated circuits.

Presently, the vast majority of integrated circuits are based on silicon due to substantially unlimited availability, the well-understood characteristics of silicon and related materials and processes and the technological experience gathered during the last 50 years. Therefore, silicon will likely remain the material of choice for future circuit generations designed for mass products. One reason for the dominant importance of silicon in fabricating semiconductor devices has been the superior characteristics of a silicon/silicon dioxide inter-face that allows reliable electrical insulation of different regions from each other. The silicon/silicon dioxide interface is stable at high temperatures and, thus, allows the performance of subsequent high temperature processes as are required, for example, for anneal cycles to activate dopants and to cure crystal damage without sacrificing the electrical characteristics of the interface.

For the reasons pointed out above, in field effect transistors, silicon dioxide is preferably used as a gate insulation layer that separates the gate electrode, frequently comprised of polysilicon or other metal-containing materials, from the silicon channel region. In steadily improving device performance of field effect transistors, the length of the channel region has continuously been decreased to improve switching speed and drive current capability. Since the transistor performance is controlled by the voltage supplied to the gate electrode to invert the surface of the channel region to a sufficiently high charge density for providing the desired drive current for a given supply voltage, a certain degree of capacitive coupling, provided by the capacitor formed by the gate electrode, the channel region and the silicon dioxide disposed therebetween, has to be maintained. It turns out that decreasing the channel length requires an increased capacitive coupling to avoid the so-called short channel behavior during transistor operation. The short channel behavior may lead to an increased leakage current and to a dependence of the threshold voltage on the channel length. Aggressively scaled transistor devices with a relatively low supply voltage and thus reduced threshold voltage may suffer from an exponential increase of the leakage current while also requiring enhanced capacitive coupling of the gate electrode to the channel region. Thus, the thickness of the silicon dioxide layer has to be correspondingly decreased to provide the required capacitance between the gate and the channel region. For example, a channel length of approximately 0.08 µm may require a gate dielectric made of silicon dioxide as thin as approximately 1.2 nm. Although, generally, high speed transistor elements having an extremely short channel may preferably be used for high speed applications, whereas transistor elements with a longer channel may be used for less critical applications, such as storage transistor elements, the relatively high leakage current caused by direct tunneling of charge carriers through an ultra-thin silicon dioxide gate insulation layer may reach values for an oxide thickness in the range or 1-2 nm that may represent limitations for performance-driven circuits. That is, product reliability and lifetime are strongly correlated with short channel effects, i.e., impact ionization and hot carrier injection (HCI) in combination with gate dielectric leakage. Moreover, other effects, such as Negative Bias Temperature Instability (NBTI), which substantially affects P-channel transistors, is increasingly becoming problematic as CMOS scaling continues to evolve. These effects are expected to become more important as the scaling of the operating voltage of the devices may not continue in the same manner as scaling of the critical device dimensions, thereby resulting in higher drive currents and electric field strengths. These reliability phenomena are known to cause pronounced device parameter shifts in threshold voltage, gate leakage and effective drive current that are necessary to sustain a stable and predictable circuit functionality and product performance.

Consequently, significant efforts are made in improving manufacturing technologies in an attempt to achieve a high yield of products meeting predetermined specifications in terms of performance, reliability and lifetime. For example, any improvements with respect to power consumption, which may be associated with the introduction of new technologies, may translate into improved performance only if the power envelope, that is, the area defined by the allowable maximum supply voltage and the maximum thermal power, remains substantially unchanged. Similarly, further device scaling may be correlated with increased operating speed of the product under consideration, while nevertheless increased power consumption may exceed the allowable design power, thereby not taking significant advantage of the reduced dimensions of the components. Hence, in this case, a product manufactured by highly sophisticated technologies may still have to be considered as a product of the same specification category irrespective of the advanced manufacturing technologies, which may possibly come along with increased production costs. Furthermore, in aggressively scaled semiconductor technology, despite any measures taken to guarantee lifetime and reliability of these products, a generally increased degradation of product performance over operating time may be observed, which may have to be taken into consideration when grouping the various products into specific categories, since the respective product has to meet the specifications over the entire lifetime of the product. For example, in advanced microprocessors, this kind of performance degradation manifests itself in a strong degradation of the maximum operating frequency with increasing operating time.

In order to ensure the desired product performance over the entire product lifetime, for instance ten years for microprocessor products, appropriately selected specifications have to be used in which corresponding safety margins or "guard bands" are included to guarantee that a product having characteristics corresponding to a lower limit of the performance specification may nevertheless stay within the specified range during the entire lifetime. This means that, for instance, microprocessors having a specific initial maximum operating frequency may have to be considered as products of lower speed grade, since the degradation in performance over the entire lifetime may finally result in a reduced maximum operating speed that would no longer be within a category corresponding to a higher speed grade.

FIG. 1a schematically illustrates the temporal progression of product performance, for instance in the form of the maximum operating frequency Fmax of microprocessor products over the lifetime, such as 10 years, wherein an initial state of the product, indicated as I, may correspond to a certain maximum operating frequency, which decreases or degrades over time to arrive at a significantly lower state F, representing the performance at the guaranteed lifetime of the product. It should be appreciated that the curve connecting the states I and F is a simplified presentation which, however, qualitatively illustrates the performance degradation of sophisticated integrated circuits.

FIG. 1b schematically illustrates a power envelope representation in which the design power of an integrated circuit is plotted against a performance parameter, such as the maximum operating frequency Fmax of microprocessors, wherein an upper limit for the thermal design power is indicated by TPL. Furthermore, an area A is illustrated in which products are included having a certain maximum operating speed or frequency as determined after fabrication of the devices while also respecting the upper limit TPL of the thermal design power. Furthermore, for the area A, a lower frequency limit is determined that indicates the lowest allowable Fmax so as to specify an actual product speed, indicated as "product speed" for a product segment A. That is, the product speed represents the required performance of the product in actual applications, which is, however, significantly lower than the lower "Fmax" limit of the area A due to the time dependent performance degradation. However, as explained above with reference to FIG. 1a, the product degradation over time may conventionally be taken into consideration by a corresponding "performance guard band." For example, a product having the maximum operating frequency I after fabrication may have the status F after the lifetime, wherein the state F has to be above the product speed, thereby requiring a moderately wide guard band. Consequently, any products having an initial maximum frequency which is located within the guard band may have to be grouped into a lower product speed segment, thereby reducing the profitability of the entire manufacturing process, as high speed products may typically be sold at higher prices.

As a consequence, reducing the guard band as much as possible may be highly desirable in view of increasing the profitability of the corresponding manufacturing process. In order to increase the number of parts fulfilling high performance requirements, an improvement in technology, for instance the advance to a next technology generation or an improvement in overall product design, may be required but may be associated with significant process modifications resulting in increased research and engineering efforts, thereby contributing to increased production costs.

In addition to taking into consideration device degradation, for instance with respect to the maximum operating frequency, by applying corresponding guard band regimes, the recovery of the maximum operating frequency over time has been suggested on the basis of an appropriate control of the supply voltage during system operation. In this control regime, an increasing of the supply voltage during the operational lifetime of the integrated circuit may be used in order to also increase the maximum operating frequency, thereby compensating to a certain degree the device deterioration. However, the increase of the supply voltage may be associated with a corresponding increase of the total power consumption, which in turn may result in a non-allowable increase of the device internal-operating temperature. Consequently, corresponding compensation techniques may be restricted to the corresponding allowable total power consumption ranges of the device under consideration. Furthermore, appropriately designed peripheral components may have to be implemented into the circuit system, such as sophisticated voltage regulators, in order to precisely adjust the supply voltage on the basis of the operational status of the integrated system. Moreover, for an efficient precise compensation of the performance degradation without exceeding allowable total power consumption ranges, a control of the externally supplied voltage within several mV may be required, which may thus add to overall complexity of the entire electronic circuit system.

The present disclosure is directed to various methods and devices that may avoid, or at least reduce, the effects of one or more of the problems identified above.

SUMMARY OF THE INVENTION

The following presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

Generally, the subject matter disclosed herein relates to sophisticated integrated circuits and methods for operating the same, wherein performance degradation over lifetime may be reduced on the basis of adapting the duty cycle of a clock signal that is used for operating the integrated circuit. Generally, duty cycle of the clock signal is to be understood as the ratio of a high level with respect to the entire period of one clock cycle, wherein corresponding fall times and rise times may be neglected. For example, a duty cycle of 50% relates to a high level of the clock signal of 50% of the total period. A duty cycle of 48%, for instance, relates to a high level of 48% and correspondingly to a low level of 52%. Since the clock signal supplied to the various components of a complex clock-based integrated circuit may have a significant influence on the operational behavior of the individual circuit portions, the variation of the duty cycle may thus affect speed-critical device portions without actually modifying the clock signal frequency. Hence, the modification of the duty cycle may thus result in a shift of the overall performance of the integrated circuit, due to a corresponding shift of performance of speed-critical signal paths, while at the same time the clock frequency of the device may be maintained. Hence, a corresponding compensation mechanism based on an adaptation of the duty cycle may therefore be considered as "neutral" with respect to any power limitations, as are typically encountered in conventional strategies in which the supply voltage may be increased in order to compensate for performance degradation. Consequently, upon determining an appropriate correlation between the duty cycle and the performance characteristics of the integrated circuit under consideration, a highly efficient control mechanism may be provided since, for instance, the duty cycle of the clock signal may be efficiently modified compared to extremely sensitive adaptations of a corresponding supply voltage used in conventional strategies.

One illustrative method disclosed herein relates to the stabilization of performance of an integrated circuit device. The method comprises determining an updated value of a parameter that indicates performance of the integrated circuit. Moreover, the method comprises controlling a duty cycle of a clock signal of the integrated circuit device on the basis of the updated value so as to stay within a specified range.

A further illustrative method disclosed herein relates to the operation of an integrated circuit. The method comprises establishing a correlation between a performance characteristic of the integrated circuit and a duty cycle of a clock signal used in the integrated circuit. The method further comprises controlling the duty cycle during operation of the integrated circuit at least several times within an operational lifetime of the integrated circuit on the basis of the correlation.

One illustrative electronic circuit system disclosed herein comprises an integrated circuit comprising an internal clock signal generator and a functional circuit portion connected to receive a clock signal of the clock signal generator. Moreover, the electronic circuit system comprises a duty cycle control unit that is operatively connected to the clock signal generator and is configured to initiate a change of a duty cycle of the clock signal several times during an operational lifetime of the integrated circuit.

BRIEF DESCRIPTION OF THE DRAWINGS

The disclosure may be understood by reference to the following description taken in conjunction with the accompanying drawings, in which like reference numerals identify like elements, and in which.

Figure 1A:
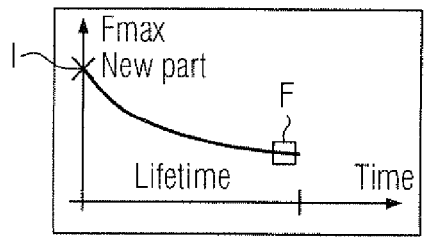
FIGS. 1a-1b schematically illustrate graphical representations of the performance behavior over lifetime of conventional advanced integrated circuits including CMOS transistors operated on the basis of a substantially constant supply voltage.

While the subject matter disclosed herein is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION

Various illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The present subject matter will now be described with reference to the attached figures. Various structures, systems and devices are schematically depicted in the drawings for purposes of explanation only and so as to not obscure the present disclosure with details that are well known to those skilled in the art. Nevertheless, the attached drawings are included to describe and explain illustrative examples of the present disclosure. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

Generally, the present disclosure relates to electronic circuit systems and methods for operating the same, wherein performance degradation of integrated circuits may be reduced or compensated for on the basis of appropriately adapting the duty cycle of a clock signal, wherein, in some illustrative embodiments, the supply voltage and also the clock signal frequency may remain non-modified over the operational lifetime of the integrated circuit. Hence, in this case, an efficient control mechanism for compensating for the natural aging of an integrated circuit may be provided without being restricted by the overall power consumption, which may be a critical factor in conventional control strategies based on an increase of the supply voltage. Furthermore, the dynamic power consumption may not increase during the compensation of the performance degradation based on the duty cycle mechanism, since the clock frequency may not be increased. It should be appreciated, however, that, if desired, the compensation mechanism of the present disclosure may also be combined with other mechanisms, such as a moderate increase of supply voltage, if the range of the compensating effect based on an appropriate adaptation of the duty cycle may have to be increased, for instance in a very advanced stage of the accumulated operational lifetime of the integrated circuit under consideration. Since the performance degradation, for instance in terms of maximum operating speed, may be dynamically reduced during the entire lifetime of the device on the basis of an appropriate adaptation of the duty cycle, the corresponding guard bands used for specifying a certain performance class of a product may be reduced, and the products may be assigned to a specific performance segment, which would conventionally have been grouped into a less sophisticated product segment. Consequently, the distribution of products in the high performance area may be accomplished on the basis of less narrow tolerance ranges, thereby increasing the number of products that may be assigned to a specific high performance product segment. Thus, not only the profitability of the corresponding technology standard may be increased, but also the overall performance of the products may be enhanced since the integrated circuits may be operated with reduced performance loss over the entire lifetime, while not unduly increasing the overall total power consumption. Corresponding parameter values for estimating the current performance characteristic may be readily obtained during the operation of the device under consideration, for instance by actually measuring the duty cycle and/or by appropriately reading out the status of a corresponding clock signal generator or a corresponding structure controlling the duty cycle of the clock signal generator. For example, in conventional strategies, the duty cycle setting for the generation of a corresponding clock signal in sophisticated integrated circuits, such as CPUs, may be "hardwired" or may be adjusted during a final test phase of the integrated circuit by setting corresponding electronic fuses. According to the principles disclosed herein, however, the duty cycle may be dynamically adapted, for instance, by replacing a corresponding hardwired control regime for the duty cycle setting by a control circuitry that may dynamically vary a corresponding control setting. For example, a plurality of corresponding "hardwired" configurations may be provided as a "switchable" array so that a plurality of different duty cycle values may be selected by enabling a respective one of the hardwired array components. In other cases, the clock signal generator may be directly controlled by an electronic circuit portion, the momentary setting of which may be stored in a non-volatile memory area if the integrated circuit is de-activated.

In some illustrative embodiments disclosed herein, a corresponding correlation between the duty cycle and the performance of the integrated circuit may be established in advance, for instance by performing accelerated aging tests of similar products operated on the basis of different duty cycles. Thus, a corresponding set of performance data and associated duty cycles may be implemented into a corresponding control regime in order to appropriately adapt the duty cycle for reducing any performance degradation over the accumulated lifetime of the integrated circuit. For instance, if a general quantitative estimation of the device degradation may be obtained for a plurality of different duty cycle values, a control strategy may include a corresponding adaptation of the duty cycle on the basis of the accumulated operational lifetime of the device without actually requiring a measurement of the momentary performance of the integrated circuit. That is, in a corresponding control strategy, different duty cycle values may be "enabled" at predefined times of the accumulated lifetime, which may be determined on the basis of the device-internal timer or on the basis of an external circuit portion used in combination with the integrated circuit. In still other illustrative embodiments, a corresponding correlation between the duty cycle and the performance of the device may be established on demand, that is, a corresponding correlation may be established at various points in time, for instance when a certain degree of performance degradation has been identified. Based on the corresponding current correlation between the duty cycle values and the device performance, an appropriate duty cycle value may be selected and may be used for the further operation of the device in order to maintain the performance characteristic thereof within a specified range. The evaluation of the momentary performance of the integrated circuit may be accomplished on the basis of a dedicated circuit portion of the integrated device, which may be strongly correlated with the performance of speed-critical signal paths within a functional portion of the integrated circuit. For example, ring oscillators and the like may be implemented into a test circuit portion and may thus be efficiently used for quantitatively estimating the momentary performance of the integrated circuit. In some illustrative embodiments, the correlation between the momentary performance values and the duty cycle may be established on the basis of corresponding "library" data obtained in advance or the duty cycle may be varied during operation of the integrated circuit in order to obtain various performance data that are associated to corresponding duty cycle values. Consequently, based on the monitoring of the current performance of the integrated circuit on the basis of a desired time resolution, a very efficient compensation for the natural aging of the integrated circuit may be accomplished, wherein further enhanced efficiency may be obtained by performing a "real time test" of the performance in response to a "real time" variation of the duty cycle.

In some illustrative embodiments, a desired initial performance of the integrated circuit may be "re-established," at least within a specified range, by storing an initial value indicative of the initial performance behavior of the integrated circuit and comparing the momentary performance and the associated duty cycles with the initial value. Thus, an appropriate duty cycle may be identified which may re-establish the initial performance behavior or which may at least maintain performance of the device within a specified range centered around the initial performance value.

It should be appreciated that the principles disclosed herein may be applied in the context of advanced integrated circuits including circuit portions based on sophisticated CMOS techniques, such as microprocessors, advanced ASICs (application specific integrated circuits), storage devices and the like, since here significant advances with respect to reducing the overall product spread regarding performance characteristics typically involve great efforts in terms of adaptation of manufacturing processes and circuit designs. The principles disclosed herein, however, may also be applied to any integrated circuit devices in which a significant dependence of performance degradation over life is observed. Consequently, unless specifically set forth in the specification or appended claims, the subject matter disclosed herein should not be considered as being restricted to any specific type of integrated circuits.

Figure 1B:
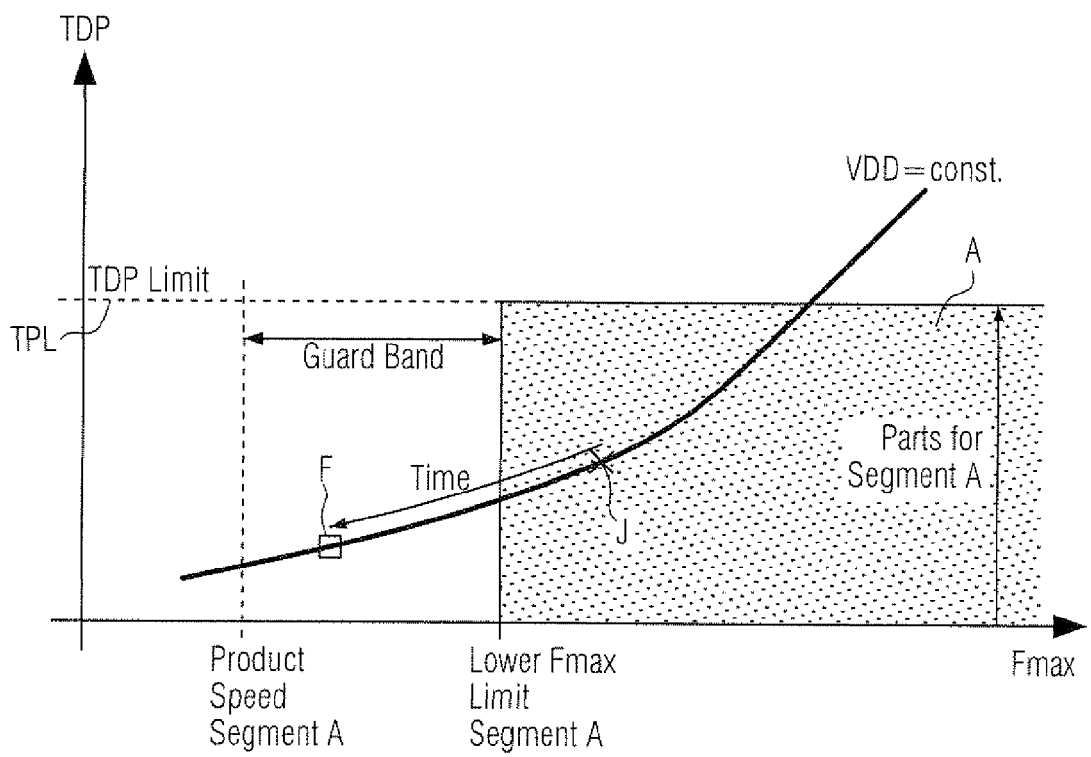
Figure 2A:
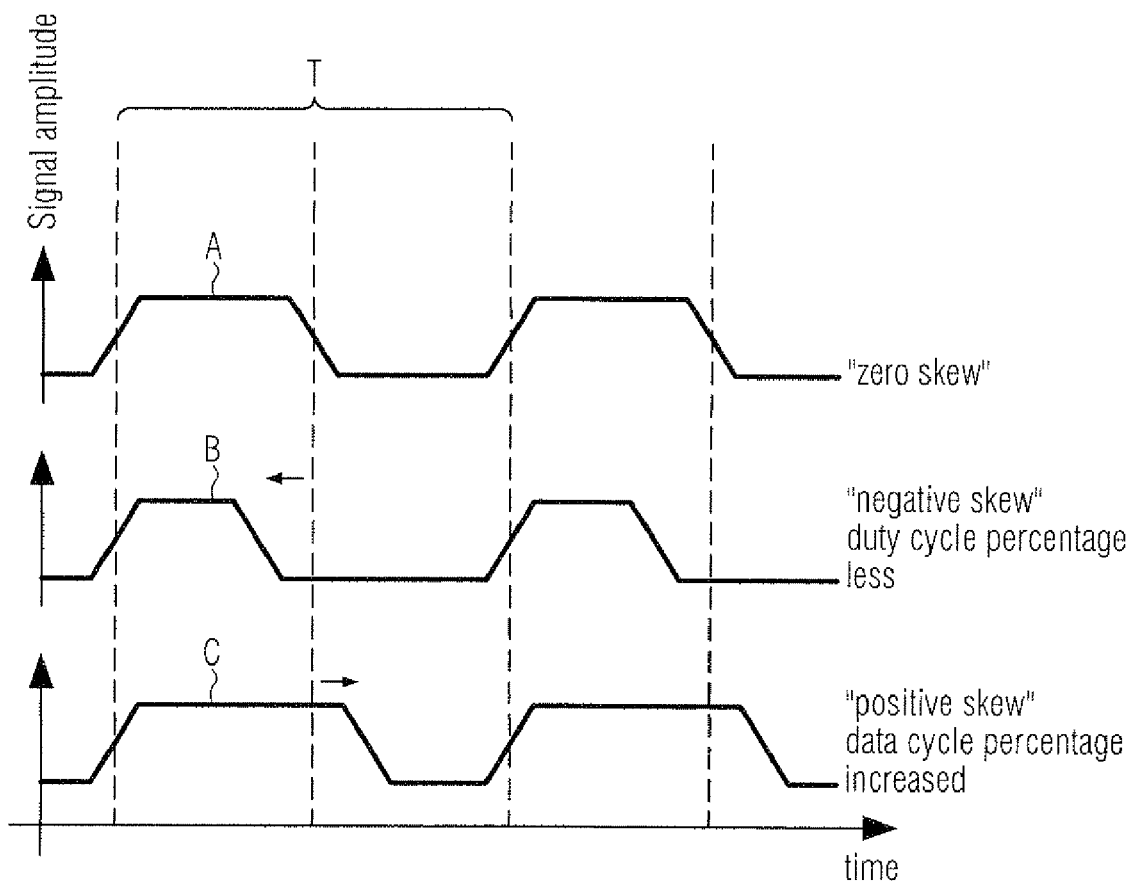
FIG. 2a schematically illustrates a time diagram of a clock signal of a given frequency with different duty cycles, as may be used for a duty cycle based compensation, according to illustrative embodiments.
Figure 2B:
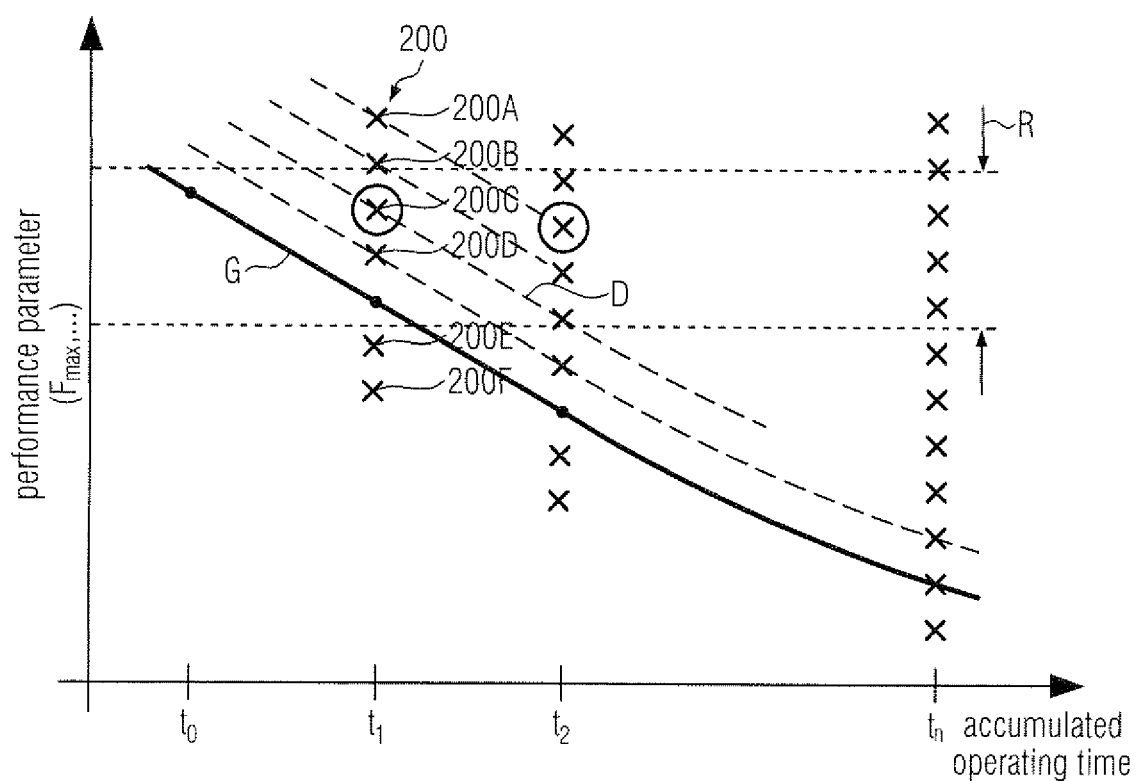
FIG. 2b schematically illustrates a diagram for demonstrating the operational behavior and a corresponding technique for compensating device degradation on the basis of applying an appropriate duty cycle over lifetime of an integrated circuit, according to illustrative embodiments.
Figure 2C:
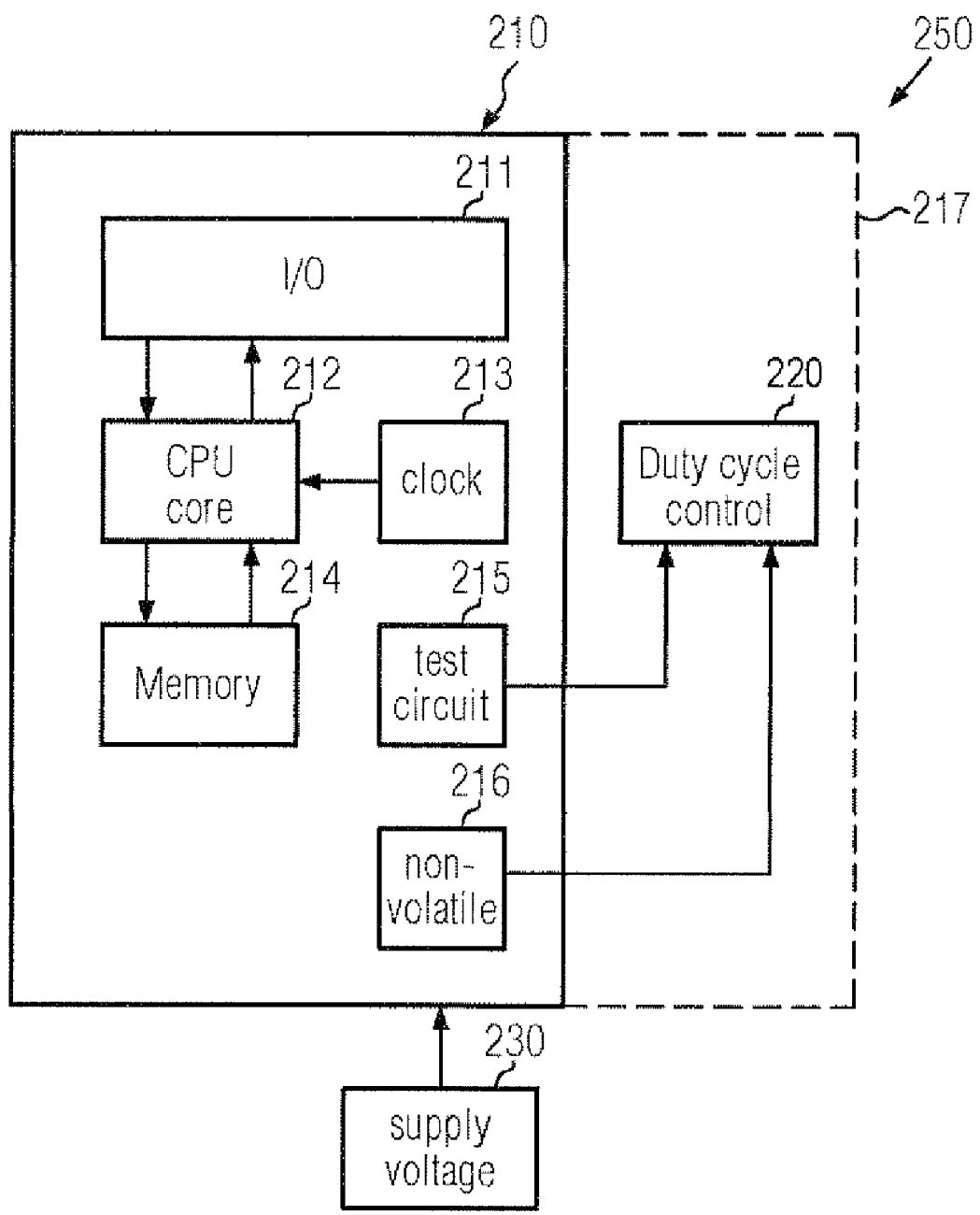
FIG. 2c schematically illustrates an electronic system comprising an integrated circuit in combination with a duty cycle control unit that is configured to compensate device degradation of the integrated circuit over lifetime, wherein the duty cycle control unit may be provided as an external component or an internal component, according to illustrative embodiments.

With reference to FIGS. 2a-2c, further illustrative embodiments will now be described in more detail, wherein reference to FIGS. 1a-1b may also be made, if appropriate.

FIG. 2a schematically illustrates a time diagram illustrating a clock signal provided at a predefined frequency wherein, however, the duty cycle may be varied. For example, three different duty cycles, represented by curves A, B and C, for a clock signal are illustrated. That is, the horizontal axis represents the time wherein for a given frequency a certain interval T may represent a full period or cycle of each of the clock signals A, B, C. The vertical axis represents the signal amplitude in arbitrary units. For example, the amplitude of the clock signal may substantially swing between the lower and the upper limit of a corresponding supply voltage. In FIG. 2a, curve A may represent the clock signal with a duty cycle of 50%, that is, the time interval of the higher level of signal A may be equal to the time interval of the low level within one clock cycle T. A corresponding duty cycle may also be referred to as a clock signal having a "zero skew." It should be appreciated that, typically, rising and falling of the clock signal may have a duration that is significantly less compared to the full period T. Curve B represents the clock signal of the same frequency, however with a "negative skew," that is, the duty cycle thereof is less compared to curve A. Consequently, the duration of the high level is less compared to the duration of the low level. For instance, the duty cycle may be 45%, indicating that, during the full time period T, the signal B may be 45% at the high signal level, including half of the rise and fall time while on the other hand 55% may correspond to the low level state of the signal B, also including half of the corresponding rise and fall times. Curve C represents the clock signal having a "positive skew" since the corresponding time duration of the high level state is increased with respect to curve A, while the corresponding low level time interval is shorter.

As previously explained, the duty cycle of the clock signal may have an influence on the overall performance of speed-critical signal paths within an integrated circuit. Depending on the limiting circuit or speed path at the given clock frequency, the corresponding limiting circuit or speed path and thus the entire integrated circuit may have a preference for increasing performance on the basis of a negative or positive duty cycle. That is, due to the complexity of modern integrated circuits, the clock signals may have to be provided to very different circuit portions, wherein different signal propagation delays and the like may result in a more or less pronounced deformation of the clock signal. Consequently, by modifying the initial duty cycle of the clock signal, the functional behavior of certain circuit portions, in particular of speed-critical portions, may be influenced, thereby resulting in overall increase or decrease of the performance, for instance the maximum operating speed of the device under consideration. Furthermore, for a given circuit configuration, the response of the integrated circuit to a variation of the duty cycle may change over time due to the natural aging of the device, for instance with respect to a shift of important device parameters, such as threshold voltage, leakage and drive current of the transistor elements. Consequently, the corresponding correlation between the duty cycle and a corresponding response of the circuit in view of overall performance characteristics may be efficiently used in compensating for the natural performance degradation.

FIG. 2b schematically illustrates a diagram representing a strategy for compensating for device degradation on the basis of an appropriate adaptation of the duty cycle of a clock signal. In FIG. 2b, the horizontal axis may represent the accumulated operating time of integrated circuits, while the vertical axis may represent one or more parameters indicative of the performance of the device, for instance the maximum operating speed, indicated as $F_{max}$, and the like may be used for quantitatively evaluating the behavior of the integrated circuit under consideration. As illustrated, at a time $T_0$, the operational lifetime of the device under consideration may "start," i.e., the device may be implemented in a corresponding electronic system and may be operated in accordance with system-specific operating conditions. At the time $T_0$, the performance behavior of the device under consideration may be determined by a corresponding value, for instance representing the maximum operating speed and the like. Curve D in FIG. 2b may represent a corresponding degradation of the performance of the device when operated under substantially constant conditions, that is, by using a substantially constant supply voltage at a stable clock frequency. For example, the behavior of curve D may represent a corresponding device behavior, as is also previously discussed with reference to FIG. 1a. According to some illustrative embodiments, the quantitatively estimated performance of the device at the initial time $T_0$ may be measured and may be used in order to determine a desired or target performance or performance range to be maintained during the entire operational lifetime of the integrated circuit. For example, a specified range indicated as R may be selected on the basis of the initial performance which may, for instance, allow significantly reduced guard bands since a corresponding performance degradation may be maintained within the range R. After a certain time, indicated by $T_1$, the duty cycle of the corresponding clock signal may be appropriately adapted to increase the performance characteristic, which may have degraded along curve D. For this purpose, an appropriate correlation between the duty cycle and performance of the device may be established in advance, for instance on the basis of corresponding accelerated aging tests and the like, so that, according to some illustrative embodiments, a specific duty cycle value may be applied at the accumulated time $T_1$ in order to maintain the performance reliably within the range R. It should be appreciated that, in this case, an actual measurement of the performance characteristic may not be necessary, as long as the general behavior of the device degradation may be appropriately represented by curve D and the corresponding response of the circuit under consideration to a variation of the duty cycle may generally be described by the correlation established in advance. Consequently, with increasing accumulating operating time, respective appropriate duty cycle values may be used for the operating of the device, wherein a corresponding time resolution for updating the duty cycle may also be selected in advance.

In other illustrative embodiments, the momentary performance characteristic of the device under consideration may be tested or measured, for instance on the basis of a device-internal circuit portion, such as a ring oscillator and the like, which may be strongly correlated to the actual performance of a functional circuit portion. For example, at time interval $t_1$, a corresponding parameter value may be determined, such as the value indicative of $F_{max}$ and may be assessed in view of its allowability. That is, it may be determined whether or not a momentary performance characteristic is within the allowable range R and whether or not a compensation is required to maintain performance within the range R before updating of the performance characteristics is performed. In some illustrative embodiments, the controller strategy may be based on the concept of maintaining the current performance closely to the initial performance, which may be accomplished by selecting an appropriate duty cycle value that provides the required degree of compensation. For this purpose, in some illustrative embodiments, respective performance values may be determined for different duty cycles. For example, corresponding performance values 200, such as values 200A, 200B, 200C, 200D, 200E, 200F, may be determined, wherein each of these performance values may be associated with a corresponding dedicated duty cycle value. For example, it may be assumed that, generally, the device may have a tendency for increasing performance upon increasing the duty cycle. For example, the value 200D may represent the performance value when operating the device with a duty cycle that is 1% higher compared to the initially used duty cycle. Similarly, the value 200C may be associated with a duty cycle that is increased by 2% and the like. On the other hand, the values 200E, 200F may represent the performance characteristic for a reduced duty cycle compared to the initially used duty cycle. In some illustrative embodiments, the performance values 200 and the associated duty cycle values may be obtained on a "real time basis," which may be accomplished by causing a clock signal generator of the device to operate with different duty cycle values within specific short time intervals, while the corresponding performance parameter values may be measured, for instance on the basis of a device-internal test portion, as previously explained. In other illustrative embodiments, the values 200 may be obtained in advance, for instance on the basis of test measurements in which a plurality of respective integrated circuits may be operated under accelerated test conditions. Consequently, a corresponding control system may select an appropriate one of the values 200 and further operation of the device under consideration may be continued by using the newly selected duty cycle. In the present example, the duty cycle corresponding to the performance value 200C may be selected to maintain the performance value at the initially determined performance of the device. It should be appreciated, however, that a corresponding control strategy may also provide any intermediate values, for instance by interpolating a corresponding correlation between performance characteristic values and the associated duty cycles. It should further be appreciated that any desired time resolution may also be selected to further reduce device variability.

At a later time $t_2$, the above-described procedure may be repeated in order to further compensate for a corresponding device degradation. For example, it may be assumed that the degradation of the device under consideration may proceed along curve D that may correspond to the duty cycle associated with the performance value 200C. Consequently, the duty cycle may be appropriately adapted, for instance using the duty cycle associated with the performance value 200A at time $t_1$, thereby maintaining overall performance of the device closely to the initial performance. It should be appreciated, however, that, in other illustrative embodiments, corresponding performance characteristic values may be determined independently of the values 200A, 200B, 200C, 200D, 200E, 200F related to the time $t_1$, which may be accomplished by obtaining corresponding performance values and associated duty cycle values in advance during corresponding test runs, as previously explained, or by real time measurement using device-internal resources. Hence, upon identifying an appropriate duty cycle value, the further operation of the device under consideration may be continued by using an updated duty cycle value, thereby maintaining overall performance of the device within the range R.

FIG. 2c schematically illustrates an electronic circuit system 250 comprising an integrated circuit 210, the operation of which is to be compensated for on the basis of a duty cycle adaptation, as previously discussed. For this purpose, the system 250 may comprise a duty cycle control unit 220 that is operatively connected to the integrated circuit 210, and which may be provided as a device-internal component of the integrated circuit 210, or which may be represented by an external device. Moreover, the electronic circuit system 250 may comprise a supply voltage source 230 that may provide a supply voltage at least for the integrated circuit 210. The integrated circuit 210 may comprise a clock signal generator 213 that is configured to provide a clock signal at least at a specified frequency, while a duty cycle of the clock signal may be adjustable, for instance on the basis of a control signal supplied by the duty cycle control circuit 220. Furthermore, the integrated circuit 210 may comprise at least one functional circuit block, such as a CPU core 212, a memory portion 214 connected to the block 212, and an input/output (I/O) interface 211. It should be appreciated, however, that any other functional circuit block may be provided in the integrated circuit 210, depending on the overall device requirements, as long as at least one speed-critical circuit portion or signal path may be operated on the basis of the clock signal provided by the generator 213. In the embodiment shown, the integrated circuit 210 may further comprise a test circuit portion 215, which may include appropriate circuit elements and the like in order to enable the monitoring of the actual performance characteristics of the integrated circuit 210. For example, the test circuit portion 215 may comprise a ring oscillator and the like which may be formed on the basis of similar circuit elements as a corresponding speed-critical circuit portion or signal path, for instance the portion 212, so that performance of the test circuit portion 215 may be strongly related to the actual performance of the speed-critical portion 212, which in turn may substantially determine the overall operating performance of the integrated circuit 210. Consequently, performance data may be obtained by the control unit 220 from the test circuit portion 215 according to any appropriate time schedule. For example, performance of the test circuit portion 215 and thus of the entire integrated circuit 210 may be monitored in a substantially continuous manner or in a time-discrete manner with appropriate time intervals. It should be appreciated that, in the embodiment shown, the control unit 220 may communicate with the clock signal generator 213 and the test circuit portion 215 by device-internal communication, such as dedicated signal buses and the like, when the unit 220 may be a device-internal component of the integrated circuit 210. In this case, the unit 220 may be provided within the same package 217, which may also accommodate the other functional components of the integrated circuit 210. For example, the integrated circuit 210 may represent a single chip system in which the various circuit portions may be implemented in a single semiconductor die, thereby providing a highly efficient manufacturing process. In other cases, two or more portions of the integrated circuit 210 including the control unit 220 may be provided on different semiconductor chips which, however, may be combined in a three-dimensional chip configuration in a common package.

In other illustrative embodiments (not shown), the unit 220 may be provided as an external component which may communicate with the integrated circuit 210 via the interface 211. For example, appropriate control signals for the generator 213 and respective data from the test portion 215 may be communicated via the interface 211, which may provide corresponding resources for interfacing with the unit 220. It should be appreciated that an appropriate control strategy may be implemented into the unit 220 and/or a corresponding non-volatile memory, such as a memory 216, wherein all specific data may be stored, such as an initial performance value or corresponding performance values and associated duty cycle values for a plurality of different accumulated operational lifetimes, as previously explained. In other illustrative embodiments, a corresponding control strategy may be implemented so as to continuously or discretely monitor the performance of the device 210 during operation and select an appropriate duty cycle value, which may result in the generation of an appropriate control signal for causing the clock signal generator 213 to update the corresponding duty cycle.

Thus, during operation of the system 250, according to some illustrative embodiments, the unit 220 may monitor the momentary performance of the integrated circuit 210 and may select an appropriate duty cycle value in order to compensate for a corresponding device degradation. For this purpose, any of the above-identified strategies may be used. As previously indicated, a corresponding adaptation of the duty cycle may be accomplished by enabling respective circuit components in the generator 213, such as hardwired components, each of which may provide a specific duty cycle, or corresponding electronic fuses may be used for this purpose. In still other illustrative embodiments, the clock signal generator 213 may be configured to be responsive to a more or less continuous control signal in order to substantially continuously vary the duty cycle of the clock signal based on the control signal supplied by the unit 220. For example, as previously indicated, an initial value or performance characteristic of the device 210 may be stored, for instance in the non-volatile memory 216, and may be used for substantially re-establishing the initial performance characteristic on the basis of an appropriately selected duty cycle value. In some illustrative embodiments, the system 250 may be operated on the basis of a substantially constant supply voltage provided by the voltage source 230, thereby not unduly increasing the static power consumption. Similarly, the clock signal generator 213 may be operated so as to provide the clock signal with a specific constant clock frequency, thereby also avoiding an increase of dynamic power consumption.

As a result, the present disclosure provides control strategies and electronic circuit systems in which product degradation may be recovered or compensated for during normal field operation of the electronic circuit system by adjusting the clock duty cycle using a corresponding duty cycle control unit. Hence, a reduced product frequency guard banding system is necessary, thereby providing additional product performance margins, which may also translate into enhanced profitability since corresponding integrated circuits may be assigned to more sophisticated product segments, such as higher speed grades. Furthermore, compared to conventional strategies for compensating for device degradation on the basis of supply voltage increase, the total power consumption may not have to be increased since an efficient compensation may be obtained at a substantially constant supply voltage at a single clock frequency.

The particular embodiments disclosed above are illustrative only, as the invention may be modified and practiced in different but equivalent manners apparent to those skilled in the art having the benefit of the teachings herein. For example, the process steps set forth above may be performed in a different order. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method of stabilizing performance of an integrated circuit device, the method comprising:
   determining a current value of an operating speed of said integrated circuit; and
   modifying a duty cycle of a clock signal of said integrated circuit device on the basis of the operating speed, wherein the modification of the duty cycle modifies the operating speed to an updated value so as to maintain the operating speed within a specified range.

2. The method of claim 1, further comprising storing an initial value of said operating speed and comparing said initial value with said current value, and wherein modifying the duty cycle of the clock signal comprises modifying the duty cycle to increase the operating speed so that the updated value is within a specified range centered on said initial value.

3. The method of claim 1, wherein said current value is determined at least several times over an operational lifetime of said integrated circuit device using a ring oscillator implemented in a test-circuit portion of the integrated circuit device, wherein an operating speed of the test-circuit portion is correlated with an operating speed of speed-critical signal paths within a functional portion of the integrated circuit.

4. The method of claim 1, wherein controlling said duty cycle of the clock signal comprises obtaining a plurality of reference values of said operating speed for different duty cycles and selecting one of said different duty cycles that is associated with one of said reference values that is within said specified range.

5. The method of claim 4, wherein said plurality of reference values is obtained at an initial phase of the operational lifetime of said integrated circuit device.

6. The method of claim 4, wherein said plurality of reference values is obtained at least several times within the operational lifetime of said integrated circuit device.

7. The method of claim 1, wherein an operating voltage of said integrated circuit device is substantially maintained throughout an operational lifetime of said integrated circuit device, and wherein the operating voltage is substantially maintained concurrently with modifying the duty cycle of the clock signal.

8. The method of claim 1, wherein determining said current value of said operating speed comprises measuring a maximum operating speed of an internal circuit portion of said integrated circuit device.

9. The method of claim 1, wherein storing said initial value of said operating speed comprises storing said initial value in a device-internal non-volatile memory.

10. The method of claim 1, wherein storing said initial value of said operating speed comprises storing said initial value in an array of electronic fuses provided in said integrated circuit device.

11. The method of claim 1, wherein controlling said duty cycle is performed by circuitry provided externally to a package accommodating said integrated circuit device.

12. The method of claim 1, wherein controlling said duty cycle is performed by a device-internal circuit portion of said integrated circuit device.

13. A method of operating an integrated circuit, the method comprising:

establishing a correlation between an operating speed of the integrated circuit and a duty cycle of a clock signal used in said integrated circuit; and controlling said duty cycle during operation of said integrated circuit at least several times within an operational lifetime of said integrated circuit on the basis of said correlation.

14. The method of claim 13, wherein establishing a correlation comprises determining a first relation between the duty cycle and a parameter indicating a maximum operating speed of said integrated circuit.

15. The method of claim 13, wherein establishing a correlation comprises determining a second relation between the duty cycle and an accumulated operating time of said integrated circuit.

16. The method of claim 14, wherein determining said first relation comprises obtaining a plurality of values of said operating speed and obtaining an associated duty cycle for each of said plurality of values.

17. The method of claim 16, further comprising determining an initial value of said operating speed and permanently storing said initial value.

18. The method of claim 17, wherein said initial value is stored in a device-internal component of said integrated circuit.

19. The method of claim 13, wherein a supply voltage of said integrated circuit is substantially maintained constant during an operational lifetime of said integrated circuit.

20. An electronic circuit system, comprising:
an integrated circuit comprising an internal clock signal generator and a functional circuit portion connected to receive a clock signal of said clock signal generator; and
a duty cycle control unit operatively connected to said clock signal generator and configured to initiate a change of a duty cycle of said clock signal several times during an operational lifetime of said integrated circuit, wherein the change of the duty cycle is determined based on a correlation between the duty cycle and an operating speed of the integrated circuit.

21. The electronic circuit system of claim 20, further comprising a package accommodating said integrated circuit.

22. The electronic circuit system of claim 21, wherein said package accommodates said duty cycle control unit.

23. The electronic circuit system of claim 22, wherein said integrated circuit and said duty cycle control unit are formed on a common semiconductor die.

24. The electronic circuit system of claim 20, wherein said integrated circuit further comprises an internal circuit portion for determining an operating speed indicative of a performance of said functional circuit portion.

25. The electronic circuit system of claim 24, wherein said integrated circuit further comprises a non-volatile memory for storing an initial parameter value of said operating speed indicative of the performance of said functional circuit portion.

\* \* \* \* \*